(12) United States Patent
Jang

(10) Patent No.: US 9,651,076 B2
(45) Date of Patent: May 16, 2017

(54) DISSIMILAR MATERIAL JOINING STRUCTURE

(71) Applicant: Hyundai Motor Company, Seoul (KR)

(72) Inventor: Junho Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/955,664

(22) Filed: Dec. 1, 2015

(65) Prior Publication Data

US 2017/0074310 A1 Mar. 16, 2017

(30) Foreign Application Priority Data

Sep. 10, 2015 (KR) ........................ 10-2015-0128557

(51) Int. Cl.
*F16B 19/08* (2006.01)

(52) U.S. Cl.
CPC ................................ *F16B 19/086* (2013.01)

(58) Field of Classification Search
CPC .......... F16B 5/04; F16B 19/08; F16B 19/086; F16B 19/10
USPC .................................................. 411/501–503
See application file for complete search history.

(56) References Cited

U.S. PATENT DOCUMENTS

| 6,663,329 | B2* | 12/2003 | Singh | ..................... | B21J 15/025 29/432.2 |
| 7,284,319 | B2* | 10/2007 | Kato | ..................... | B21J 15/025 29/243.53 |
| 7,628,573 | B2* | 12/2009 | Philipskotter | ......... | F16B 19/086 411/501 |
| 7,762,753 | B2* | 7/2010 | Jokisch | ................. | F16B 19/086 411/179 |
| 7,870,656 | B2* | 1/2011 | Eberlein | ................ | B21J 15/025 219/157 |
| 8,070,406 | B2* | 12/2011 | Trinick | ................... | B21J 15/025 29/525.01 |
| 8,250,728 | B2* | 8/2012 | Stevenson | ............. | B21J 15/025 29/525.14 |
| 8,763,233 | B2* | 7/2014 | Bartig | ................... | F16B 19/086 29/432 |

(Continued)

FOREIGN PATENT DOCUMENTS

| JP | 2005-069451 A | 3/2005 |
| KR | 10-2013-0051126 A | 5/2013 |

(Continued)

*Primary Examiner* — Roberta Delisle
(74) *Attorney, Agent, or Firm* — Mintz Levin Cohn Ferris Glovsky and Popeo, P.C.; Peter F. Corless

(57) ABSTRACT

Disclosed is a joining structure for joining dissimilar materials, such as a plastic plate and a metal plate. The joining structure is positioned or formed at where a plastic plate and a metal plate are joined. The joining structure includes: a self-piercing rivet piercing through the plastic plate to be pressed onto the metal plate and subjected to plastic deformation. In particular, the plastic plate includes a self-healing capsule containing a self-healing agent in a base material of a plastic resin and a catalyst being polymerized with the self-healing agent. The self-healing capsule is broken by a crack of the base material at a periphery of a pierced portion of the plastic plate, and the self-healing agent flowing out of the self-healing capsule fills a gap of the crack and causes polymerization with the catalyst to cure the crack portion.

13 Claims, 7 Drawing Sheets

(56) References Cited

U.S. PATENT DOCUMENTS

| | | | |
|---|---|---|---|
| 2004/0068854 A1* | 4/2004 | Kato | B21J 15/025 29/432.2 |
| 2005/0019137 A1* | 1/2005 | Iwatsuki | B21J 15/025 411/501 |
| 2005/0111934 A1* | 5/2005 | Ladouceur | B23P 19/062 411/501 |
| 2014/0242373 A1* | 8/2014 | Campbell | B32B 7/08 428/304.4 |

FOREIGN PATENT DOCUMENTS

| KR | 10-2013-0134973 A | 12/2013 |
|---|---|---|
| KR | 10-2016-0035621 A | 4/2016 |

\* cited by examiner

DISSIMILAR MATERIAL JOINING STRUCTURE

CROSS-REFERENCE TO RELATED APPLICATION

This application claims priority to and the benefit of Korean Patent Application No. 10-2015-0128557 filed in the Korean Intellectual Property Office on Sep. 10, 2015, the entire contents of which are incorporated herein by reference.

BACKGROUND OF THE INVENTION (a) Field of the Invention

The present invention relates to a joining structure of a plastic material and a metal material.

(b) Description of the Related Art

Recently, in accordance with a trend toward high strength and weight reduction of a vehicle body, a steel sheet such as ultra-high tensile steel, a nonferrous metal plate such as aluminum or magnesium, and a plate made of a plastic material such as carbon fiber reinforced plastic (CFRP) or glass fiber reinforced plastic (GFRP) have been frequently used as a material of the vehicle body.

Among others, since the plastic composite material has excellent strength, elasticity, lightweight property, and stability, the plastic composite material has been highlighted as one of the main materials used in aviation and vehicle industries. For example, in the related arts, it is expected that the subsequent use of the plastic composite material will be further expanded and a manufacturing amount thereof will be also promptly increased.

The plastic composite material has been obtained by impregnating plastic resins in carbon fibers or glass fibers, followed by curing. For example, the plastic composite material may be manufactured by manufacturing the carbon fibers or the glass fibers in a winding shape or a woven fabric shape and then impregnating the carbon fibers or the glass fibers in the plastic resins, followed by curing. Since plastic resins have excellent hardness but are easily broken because tensile strength is poor and the carbon fibers have high tensile strength but do not have bending repulsive power, the plastic composite material may be manufactured by combining the plastic resins and the carbon fibers.

Meanwhile, in order to manufacture the aforementioned plastic composite material as a plate and apply the plastic composite plate to the vehicle body, the plastic composite plate and the metal plate may be joined, but due to distinct physical properties of the two materials, laser welding or spot welding may not be properly performed.

Therefore, in a certain example of the related arts, the dissimilar material plastic composite plate and the metal plate may be joined by a very limitative joining mode, such as a bonding mode using an adhesive or a mechanical joining mode using engagement parts.

Among the modes, examples of the mechanical joining mode of the plastic composite plate and the metal plate using the engagement parts may include a rivet joining technology using a self-piercing rivet. In the mechanical joining technology using the self-piercing rivet, a shape of a joined portion is almost similar to that of spot welding, and thus a design change of the joined portion of the plastic composite plate and the metal plate may be minimized.

In the aforementioned mechanical joining technology using the self-piercing rivet, the plastic composite plate and the metal plate may be joined by allowing the self-piercing rivet to pierce through the plastic composite plate by punching pressure, followed by pressing onto the metal plate and plastic deformation.

However, in the mechanical joining technology using the self-piercing rivet, the self-piercing rivet pierces through the plastic composite plate as it is, and the metal plate is combined with the plastic composite plate while being simply in contact with the plastic composite plate. Accordingly, the periphery of the self-piercing rivet pierced portion of the plastic composite plate may be damaged and joining force of the plastic composite plate with respect to the metal plate may deteriorate.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention provides a joining structure which two or more of dissimilar materials or parts are joined together, such that which damage to a periphery of a self-piercing rivet pierced portion of a plastic plate or a plastic composite plate can be minimized, and joining force of the plastic composite plate can be increased with respect to a metal plate. The plastic composite plate can be understood as plastic plate that comprises plastic or a plastic plate.

In one aspect, the present invention provides a joining structure that may comprise plastic plate comprising plastic or a plastic plate; metal plate that comprises metal and is different from the plastic plate; and a self-piercing rivet piercing through the plastic composite plate to be pressed onto the metal plate and subjected to plastic deformation. In particular, the plastic composite plate may comprise a self-healing capsule containing a self-healing agent in a base material of a plastic resin and a catalyst being polymerized with the self-healing agent. In addition, the self-healing capsule may be broken by a crack of the base material at a periphery of a pierced portion of the plastic composite plate, and the self-healing agent flowing out of the self-healing capsule may fill the gap of the crack and causes polymerization with the catalyst to cure the crack portion.

The "dissimilar materials" as used herein may refer to at least two or more materials, each of which has at least one different physical, chemical or material properties from each other, for example, in composition, thermal expansion coefficient, boiling or melting point, hardness, ductility, brittleness, fluidity, stiffness, thermal conductivity, electrical conductivity, tension, strength, viscosity, moldability, and the like. The dissimilar materials may have various level of dissimilarity, for example, difference in a certain property value greater than about 10%, 20%, 30%, 40%, 50%, 60%, 70%, 80%, or 90%, however, the degree of dissimilarity may not be particularly limited.

The self-healing agent may be polymerized with the catalyst and may adhere a surface of the self-piercing rivet and the pierced portion of the plastic composite plate to each other.

The plastic composite plate may include an adhesive capsule containing an adhesive in the base material.

The adhesive capsule may be broken at a pierced portion of the plastic composite plate, through which the self-piercing rivet pierces, and a surface of the self-piercing rivet and the pierced portion of the plastic composite plate may be adhered to each other by the adhesive flowing out of the adhesive capsule.

The self-piercing rivet may include a head portion supporting the plastic composite plate, and a shank portion integrally connected to the head portion and piercing through the plastic composite plate.

A surface of the shank portion and the pierced portion of the plastic composite plate may be adhered by the adhesive.

The adhesive flowing out while the adhesive capsule is broken may be provided in the gap of the crack.

The self-healing agent may comprise a mixture of dicyclopentadiene or polydimethylsiloxane and polydiethoxysiloxane.

The catalyst may comprise bis(tricyclohexylphosphine) benzylidine ruthenium dichloride or di-n-butyltin dilaurate.

A capsule outer cover of the self-healing capsule and the adhesive capsule may comprise urea-formaldehyde.

The plastic composite plate may comprise a glass fiber reinforced plastic (GFRP) or a carbon fiber reinforced plastic (CFRP).

In another aspect, the present invention provides a vehicle part that comprises the joining structure as described herein. An exemplary vehicle part includes a vehicle body panel.

Further provided in the present invention are vehicles that comprise the vehicle part including the joining structure as described herein.

Other aspects of the inventions are disclosed infra.

BRIEF DESCRIPTION OF THE DRAWINGS

FIG. 3A shows an exemplary plastic composite plate 1, an exemplary metal plate 2 and a head portion 11 of an exemplary self-piercing rivet 10. FIG. 3B shows an exemplary shank portion 13 of the self-piercing rivet 10 according to an exemplary embodiment.

FIG. 4A shows that a crack is formed in processes of FIGS. 3A-3B, and FIG. 4B shows that a capsule outer cover is broken by the crack. FIG. 4C shows an exemplary self-healing agent that flowing out and an exemplary self-healing agent filling the gap of the crack and contacting with the catalyst.

<Description of symbols>

Figure 1:
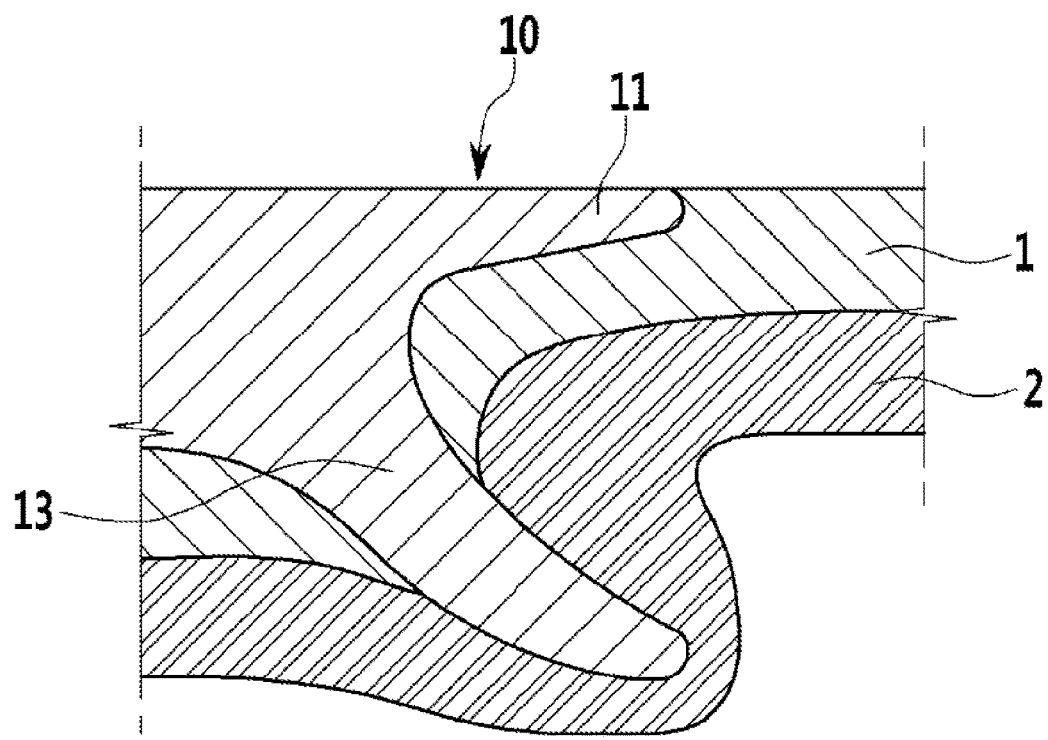
FIG. 1 is a cross-sectional schematic diagram schematically illustrating a dissimilar material joining structure according to an exemplary embodiment of the present invention.

| | |
|---|---|
| 1 . . . Plastic composite plate | 1a . . . fiber |
| 1b . . . Base material | 2 . . . Metal plate |
| 9 . . . Crack | 10 . . . Self-piercing rivet |
| 11 . . . Head portion | 13 . . . Shank portion |
| 30 . . . Self-healing capsule | 31, 71 . . . Capsule outer cover |
| 33 . . . Self-healing agent | 50 . . . Catalyst |
| 70 . . . Adhesive capsule | 73 . . . Adhesive |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown so as to be easily understood by the person with ordinary skill in the art. As those skilled in the art would realize, the described embodiments may be modified in various different ways, all without departing from the spirit or scope of the present invention.

A part irrelevant to the description will be omitted to clearly describe the present invention, and the same elements will be designated by the same reference numerals throughout the specification.

The size and thickness of each configuration shown in the drawings are arbitrarily shown for understanding and ease of description, but the present invention is not necessarily limited thereto, and the thicknesses of portions and regions are exaggerated for clarity.

In addition, in the following detailed description, designations of constitutions are classified into first and second constitutions to classify the constitutions that are identical with each other, but the constitutions are not limited to the order thereof in the following description.

In addition, the terms "... unit", "... means", "... part", and "... member" described in the specification mean units of comprehensive constitutions for performing at least one function or operation.

FIG. 1 is a cross-sectional schematic diagram schematically illustrating a joining structure according to an exemplary embodiment of the present invention.

Referring to FIG. 1, a joining structure 100 according to an exemplary embodiment of the present invention may be parts for assembling a vehicle body, such as a vehicle body panel.

For example, the joining structure 100 may be positioned where two or more plates 1 and 2 used as the vehicle body panel are integrally joined, in particular, when the plate 1 and the plate 2 may be formed of different materials.

For example, the joining structure 100 according to an exemplary embodiment of the present invention may be a part where dissimilar materials of a plastic composite plate 1 and a metal plate 2 may be integrally joined in order to promote a weight reduction of the vehicle body panel.

For example, the plate 1 may be a plastic composite and the plate 2 may be a metal plate. However, the plastic composite plate 1 and the metal plate 2 may not be necessarily limited to be applied to the panel for the vehicle body, but may be applied to various kinds of vehicle body structures such as members and frames for the vehicle body.

Moreover, it should not be understood that the protection scope of the present invention is limited to plate parts assembled with the vehicle body, but the technical spirit of the present invention may be applied to predetermined plate parts as long as the plate parts are various kinds of assembled structures for various purposes.

Meanwhile, the plastic composite plate 1 may be obtained by manufacturing a plastic composite material into the plate, and the plastic composite material may include a carbon fiber reinforced plastic (CFRP). In addition, the plastic composite material may further include a glass fiber reinforced plastic (GFRP).

The plastic composite plate 1, as compared to a metal material, may have improved strength and elasticity, the plastic composite plate may have improved resistance to repeated fatigue. Further, since a thermal expansion coefficient of the plastic composite is small, dimensional stability may be excellent, and electric conductivity, corrosion resistance, and vibration attenuation performance thereof may be excellent.

The plastic composite plate 1 may be formed into the plate shape. The plate of the plastic composite may be formed by laminating a plurality of material fibers where a plastic resin is impregnated in the fiber material and curing the plastic resin.

The metal plate 2 may include a plate formed of general steel sheet, stainless steel, and high-tensile steel. For example, the metal plate 2 may include a plate formed of a nonferrous alloy material such as aluminum and magnesium materials.

According to an exemplary embodiment of the present invention, the joining structure 100 may include the plastic composite plate 1 and the metal plate 2 that may be joined by a mechanical joining mode. As such, damage to a periphery of a joined portion of the plastic composite plate 1 may be minimized and joining force of the plastic composite plate 1 may be substantially increased with respect to the metal plate 2.

Hereinafter, based on the drawings, various examples where the plastic composite plate 1 and the metal plate 2 are joined by the mechanical joining mode are described. For, example, the plastic composite plate 1 may be overlapped on an upper surface of the metal plate 2.

However, the aforementioned definition of the direction is a relative meaning, and the direction may be changed according to a reference position and a joining direction of the plastic composite plate 1 and the metal plate 2 and the like, and thus the aforementioned reference direction is not necessarily limited to the reference direction of the present exemplary embodiment.

The joining structure 100 according to an exemplary embodiment of the present invention may include a self-piercing rivet 10 piercing through the plastic composite plate 1 to be pressed onto the metal plate 2 and subjected to plastic deformation.

The self-piercing rivet 10 may pierce through the plastic composite plate 1, for example, by a punch when the plastic composite plate 1 and the metal plate 2 may be overlapped, be splayed outwardly along a molding valley of a die (as known as, "an anvil" in the art), and be pressed onto the metal plate 2 to join the plastic composite plate 1 and the metal plate 2.

The self-piercing rivet 10 may include a head portion 11 and a shank portion 13 integrally connected to the head portion 11. The head portion 11 may support a riveting target point of the plastic composite plate 1.

In addition, the shank portion 13 may pierce the plastic composite plate 1, for example, by pressing force of the punch, be subjected to plastic deformation along the molding valley of the die, and be pressed onto the metal plate 2.

Figure 2:
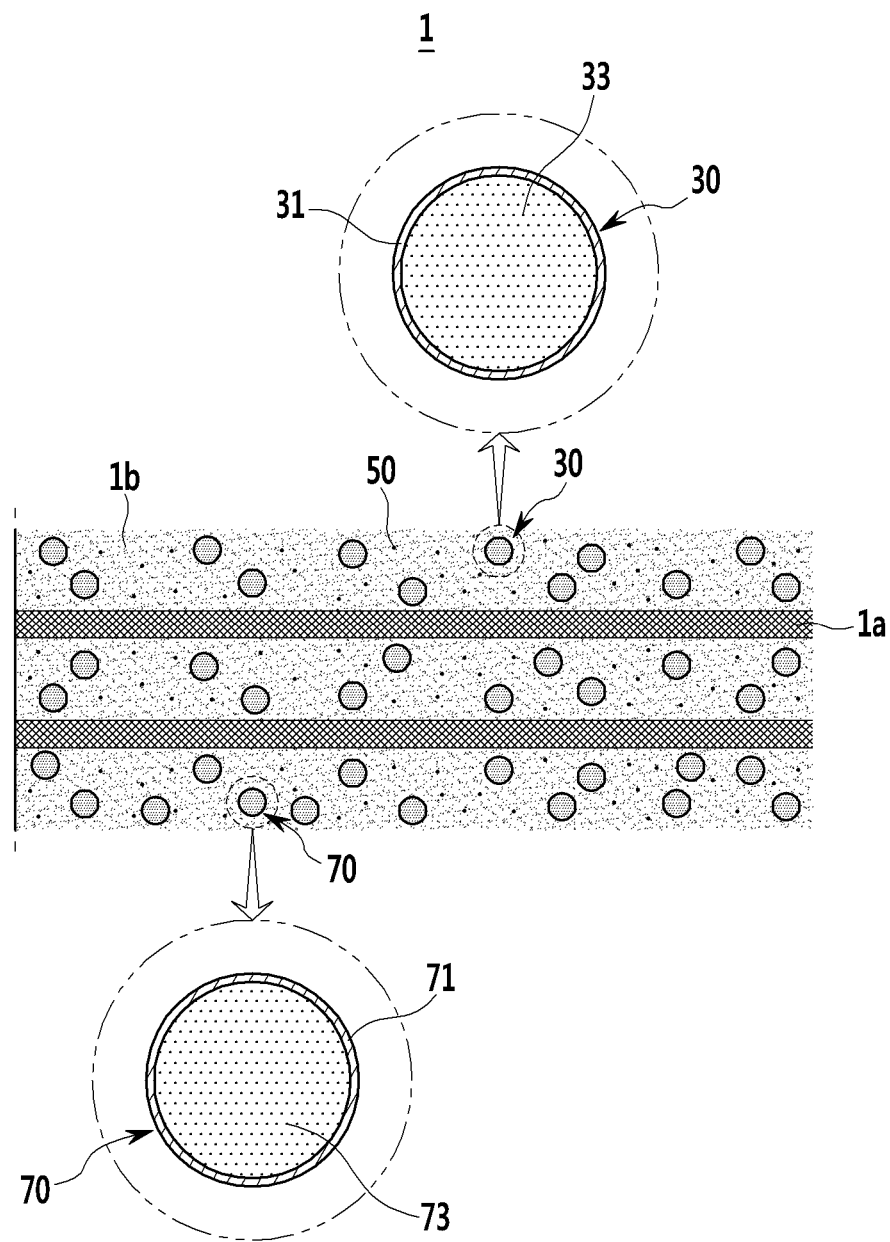
FIG. 2 is a cross-sectional schematic diagram illustrating a portion of a plastic composite plate applied to the dissimilar material joining structure according to the exemplary embodiment of the present invention.

In an exemplary embodiment of the present invention, the plastic composite plate 1, as illustrated in FIG. 2, may be obtained by impregnating a base material 1b of a plastic resin in a material fiber 1a, followed by curing, and a self-healing capsule 30, a catalyst 50, and an adhesive capsule 70 are included in the base material 1b.

In an exemplary embodiment of the present invention, the self-healing capsule 30 may contain a self-healing agent 33, and include a capsule outer cover 31 encapsulating the self-healing agent 33.

The capsule outer cover 31 may be broken by a crack formed at a periphery of a pierced portion when the shank portion 13 of the self-piercing rivet 10 pierces through the riveting target point of the plastic composite plate 1. For example, the capsule outer cover 31 may comprise urea-formaldehyde.

The self-healing agent 33 may be a liquid material that may self-heal the crack formed at the periphery of the pierced portion of the plastic composite plate 1 flow out of the capsule outer cover 31 broken by the crack to fill the crack. In addition, the self-healing agent 33 may self-cure the crack as being polymerized with the catalyst 50 as will be described later. The self-healing agent 33 may include a mixture of dicyclopentadiene or polydimethylsiloxane and polydiethoxysiloxane.

When the self-piercing rivet 10 pierces through the plastic composite plate 1, the self-healing agent 33 may flow out of the capsule outer cover 31 broken at the pierced portion, and may come into contact with the catalyst 50 to be polymerized. Accordingly, the self-piercing rivet 10 may adhere the surface of the shank portion 13 of the self-piercing rivet 10 and the pierced portion of the plastic composite plate 1 to each other.

In an exemplary embodiment of the present invention, the catalyst 50 may be present in the self-healing capsule 30 in the base material 1b, and may contact with the self-healing agent 33 flowing out of the self-healing capsule 30 to be polymerized.

The catalyst 50 may comprise, for example, bis(tricyclohexylphosphine)benzylidine ruthenium dichloride or di-n-butyltin dilaurate, but the examples are not limited thereto.

In an exemplary embodiment of the present invention, the adhesive capsule 70 may be present together with the self-healing capsule 30 in the base material 1b, contain an adhesive 73, and include a capsule outer cover 71 encapsulating the adhesive 73.

The capsule outer cover 71 may be broken at the pierced portion of the plastic composite plate 1 when the shank portion 13 of the self-piercing rivet 10 pierces through the riveting target point of the plastic composite plate 1. Further, the capsule outer cover 71 may be broken by the crack formed at the periphery of the pierced portion. For example, the capsule outer cover 71 may be formed of urea-formaldehyde.

When the self-piercing rivet 10 pierces through the plastic composite plate 1, the adhesive 73 may flow out of the capsule outer cover 71 broken at the pierced portion to adhere the surface of the self-piercing rivet 10 and the pierced portion of the plastic composite plate 1 to each other. That is, the surface of the shank portion 13 of the self-piercing rivet 10 and the pierced portion of the plastic composite plate 1 may be adhered to each other by the adhesive 73.

In addition, the adhesive 73 may flow out of the capsule outer cover 71 broken by the crack formed at the periphery of the pierced portion of the plastic composite plate 1 to fill the gap of the crack and cure damage of the periphery of the pierced portion of the plastic composite plate 1.

Hereinafter, a joining method of the dissimilar material joining structure 100 having the aforementioned constitution will be described in detail with reference to the accompanying drawings.

FIGS. 3 to 7 are views for illustrating process of the joining method and the joining structures according to an exemplary embodiments of the present invention.

Figure 3A:
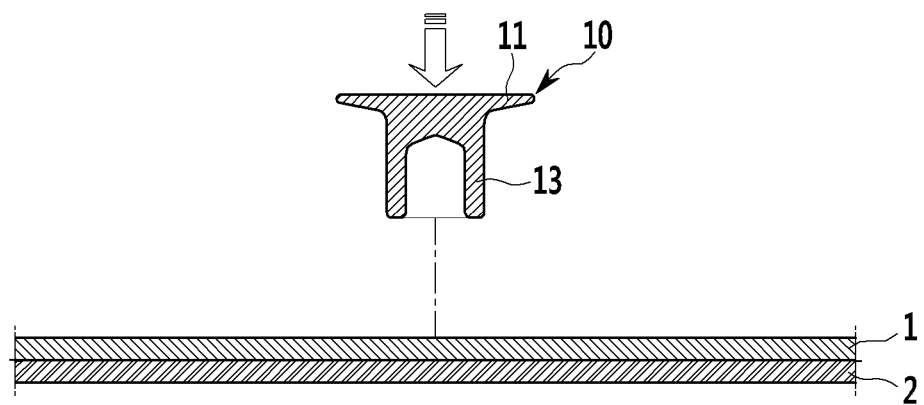
FIGS. 3A-3B illustrate an exemplary joining method and an exemplary joining structure of dissimilar materials according to an exemplary embodiment of the present invention.

As shown in FIG. 3A, the plastic composite plate 1 and the metal plate 2 overlapped with each other may be positioned in a die (not illustrated in the drawing) of a self-piercing rivet system, predetermined pressing force may be applied to the head portion 11 of the self-piercing rivet 10 through a punch.

Figure 3B:
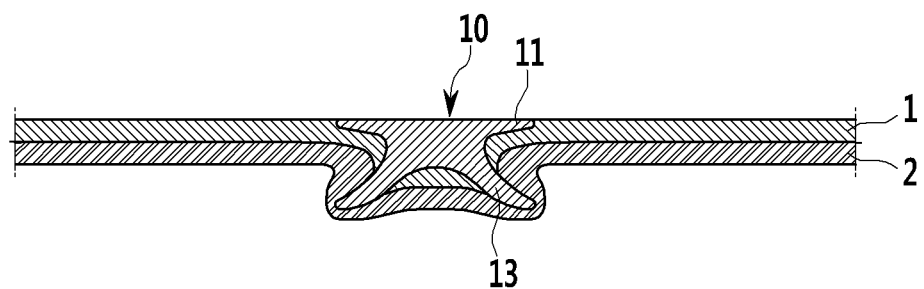

Then, as shown in FIG. 3B, the shank portion 13 of the self-piercing rivet 10 may pierce through the plastic composite plate 1, be splayed in an outward direction along the molding valley of the die, and be pressed onto the metal plate 2 to integrally join the plastic composite plate 1 and the metal plate 2.

Figure 4A:
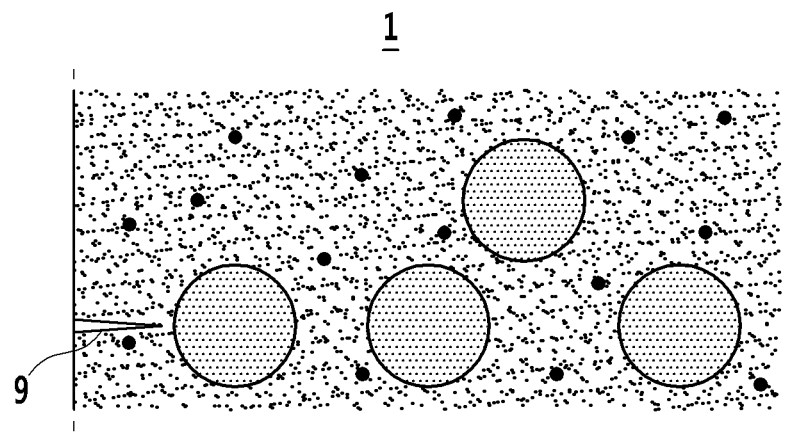
FIGS. 4A-4C illustrate an exemplary joining method and an exemplary joining structure of dissimilar materials according to an exemplary embodiment of the present invention.
Figure 4B:
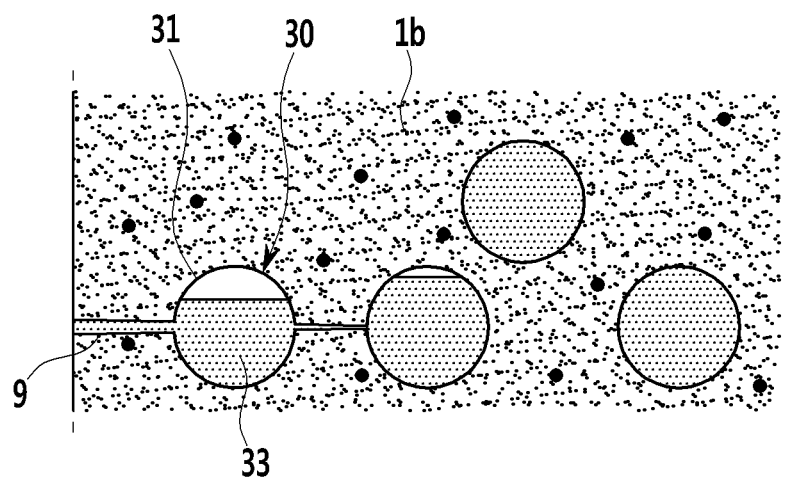

In the those processes of FIGS. 3A-3B, when the shank portion 13 of the self-piercing rivet 10 pierces through the riveting target point of the plastic composite plate 1, at the periphery of the pierced portion, as shown in FIG. 4A, a crack 9 may be formed. Accordingly, in the self-healing capsule 30 included in the base material 1b of the plastic composite plate 1, as shown in FIG. 4B, the capsule outer cover 31 may be broken by the crack 9.

Figure 4C:
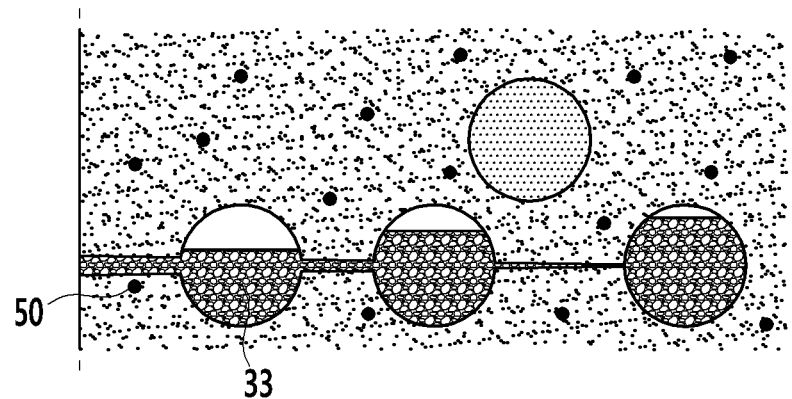

Then, according to an exemplary embodiment, shown in FIG. 4C, the self-healing agent 33 may flow out when the capsule outer cover 31 of the self-healing capsule 30 is broken. The self-healing agent 33 may fill the gap of the crack 9 and contact with the catalyst 50 at the periphery thereof to be polymerized and self-cure the crack portion.

Figure 5:
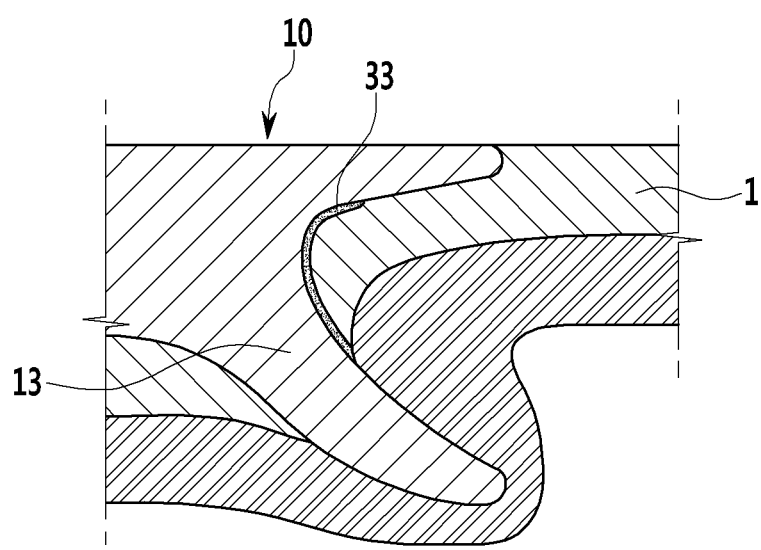
FIG. 5 illustrates an exemplary process of joining method and an exemplary joining structure by bringing an exemplary self-healing agent into contact with the catalyst 50 to be polymerized according to an exemplary embodiment of the present invention.

Further, as described above, in an exemplary embodiment of the present invention, by bringing the self-healing agent 33 into contact with the catalyst 50 to be polymerized, as shown in FIG. 5, the surface of the shank portion 13 of the self-piercing rivet 10 and the pierced portion of the plastic composite plate 1 may be adhered to each other.

Figure 6:
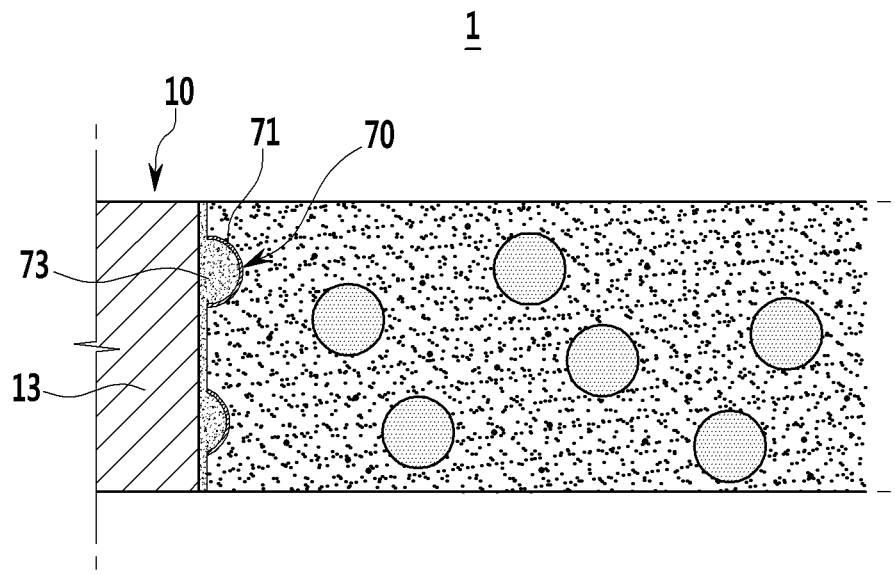
FIG. 6 illustrates an exemplary process of joining method and an exemplary joining structure such as the shank portion of the self-piercing rivet piercing through the riveting target point of the plastic composite plate and a broken capsule outer cover of an exemplary adhesive capsule according to an exemplary embodiment of the present invention.

As shown in FIG. 6, when the shank portion 13 of the self-piercing rivet 10 pierces through the riveting target point of the plastic composite plate 1, at the pierced portion of the plastic composite plate 1, the capsule outer cover 71 of the adhesive capsule 70 may be broken.

Accordingly, the adhesive 73 may flow out of the capsule outer cover 71 broken at the pierced portion of the plastic composite plate 1, and the surface of the shank portion 13 of the self-piercing rivet 10 and the pierced portion of the plastic composite plate 1 may be adhered to each other through the adhesive 73.

Figure 7:
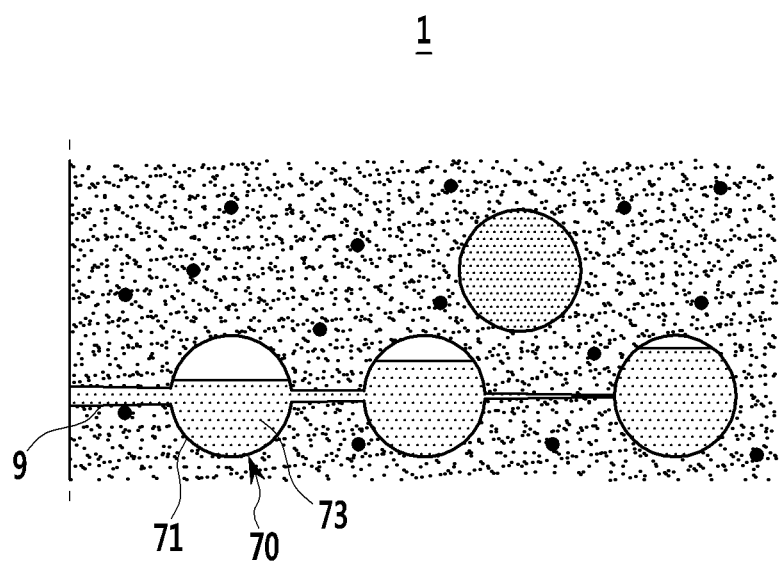
FIG. 7 illustrates an exemplary adhesive of an exemplary joining method and an exemplary joining structure that flows out of the capsule outer cover broken by the crack and fill a gap of the crack according to an exemplary embodiment of the present invention.

On the other hand, in the adhesive capsule 70, as shown in FIG. 7, the adhesive 73 may flow out of the capsule outer cover 71 broken by the crack 9 formed at the periphery of the pierced portion of the plastic composite plate 1, and the adhesive 73 may fill the gap of the crack 9 and cure damage of the periphery of the pierced portion of the plastic composite plate 1.

According to the joining structure 100 according to various exemplary embodiments of the present invention, damage of the periphery of the joined portion of the plastic composite plate 1 may be minimized through the self-healing capsule 30, and joining force of the plastic composite plate 1 with respect to the metal plate 2 may be further increased through the adhesive capsule 70.

While this invention has been described in connection with what is presently considered to be various exemplary embodiments, it is to be understood that the invention is not limited to the disclosed embodiments, but, on the contrary, is intended to cover various modifications and equivalent arrangements included within the spirit and scope of the appended claims.

What is claimed is:

1. A joining structure comprising:
   plastic plate comprising plastic or a plastic plate;
   metal plate that comprises metal and is different from the plastic plate; and
   a self-piercing rivet piercing through the plastic plate to be pressed onto the metal plate and subjected to plastic deformation,
   wherein the plastic plate comprises a self-healing capsule containing a self-healing agent in a base material of a plastic resin and a catalyst being polymerized with the self-healing agent, wherein the self-healing capsule is broken by a crack of the base material at a periphery of a pierced portion of the plastic plate, and
   wherein the self-healing agent flowing out of the self-healing capsule fills a gap of the crack and causes polymerization with the catalyst to cure the crack portion.

2. The joining structure of claim 1, wherein the self-healing agent polymerizes with the catalyst and adheres a surface of the self-piercing rivet and the pierced portion of the plastic plate to each other.

3. The joining structure of claim 1, wherein the plastic plate comprises an adhesive capsule containing an adhesive in the base material.

4. The joining structure of claim 3, wherein the adhesive capsule is broken at a pierced portion of the plastic plate, through which the self-piercing rivet pierces, and a surface of the self-piercing rivet and the pierced portion of the plastic plate are adhered to each other by the adhesive flowing out of the adhesive capsule.

5. The joining structure of claim 4, wherein the self-piercing rivet includes a head portion supporting the plastic plate, and a shank portion integrally connected to the head portion and piercing through the plastic plate, and a surface of the shank portion and the pierced portion of the plastic plate are adhered by the adhesive.

6. The joining structure of claim 4, wherein the adhesive flowing out while the adhesive capsule is broken is provided in the gap of the crack.

7. The joining structure of claim 1, wherein the self-healing agent comprises a mixture of dicyclopentadiene or polydimethylsiloxane and polydiethoxysiloxane.

8. The joining structure of claim 7, wherein the catalyst comprises bis(tricyclohexylphosphine)benzylidine ruthenium dichloride or di-n-butyltin dilaurate.

9. The joining structure of claim 8, wherein a capsule outer cover of the self-healing capsule and the adhesive capsule comprises urea-formaldehyde.

10. The joining structure of claim 1, wherein the plastic plate comprises a glass fiber reinforced plastic (GFRP) or a carbon fiber reinforced plastic (CFRP).

11. A vehicle part that comprises a joining structure of claim 1.

12. The vehicle part of claim 11 is a vehicle body panel.

13. A vehicle comprising a vehicle part of claim 11.

* * * * *